(12) United States Patent
Hanazato et al.

(10) Patent No.: US 11,401,430 B2
(45) Date of Patent: Aug. 2, 2022

(54) WHITE INK, INK SET, AND RECORDING METHOD

(71) Applicant: Nippon Kayaku Kabushiki Kaisha, Tokyo (JP)

(72) Inventors: Akitsu Hanazato, Tokyo (JP); Hisamitsu Arakawa, Tokyo (JP); Yuta Hagiwara, Tokyo (JP); Motohiro Seki, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/981,990

(22) PCT Filed: Mar. 25, 2019

(86) PCT No.: PCT/JP2019/012529
§ 371 (c)(1),
(2) Date: Sep. 17, 2020

(87) PCT Pub. No.: WO2019/188995
PCT Pub. Date: Oct. 3, 2019

(65) Prior Publication Data
US 2021/0363367 A1 Nov. 25, 2021

(30) Foreign Application Priority Data

Mar. 26, 2018 (JP) .............................. JP2018-058047
Mar. 26, 2018 (JP) .............................. JP2018-058049

(51) Int. Cl.
*C09D 11/322* (2014.01)
*D06P 1/52* (2006.01)
*D06P 5/30* (2006.01)
*B41J 2/21* (2006.01)

(52) U.S. Cl.
CPC .......... *C09D 11/322* (2013.01); *B41J 2/2107* (2013.01); *B41J 2/2114* (2013.01); *D06P 1/5285* (2013.01); *D06P 5/30* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106

See application file for complete search history.

(56) References Cited

U.S. PATENT DOCUMENTS

| | | | |
|---|---|---|---|
| 2009/0306285 A1 | 12/2009 | Li et al. | |
| 2010/0091052 A1 | 4/2010 | Ogawa et al. | |
| 2012/0188305 A1* | 7/2012 | Shiono | C09D 11/322 347/20 |
| 2013/0066006 A1* | 3/2013 | Miyajima | C09D 11/322 524/497 |
| 2016/0102220 A1* | 4/2016 | Kido | C09D 11/322 428/195.1 |
| 2016/0272832 A1 | 9/2016 | Kobayashi et al. | |
| 2017/0121543 A1* | 5/2017 | Sakaguchi | C09D 11/322 |
| 2017/0137648 A1* | 5/2017 | Seki | C09D 11/102 |
| 2017/0283637 A1 | 10/2017 | Saki | |
| 2017/0283638 A1 | 10/2017 | Saki | |
| 2017/0362450 A1 | 12/2017 | Oriakhi et al. | |
| 2018/0320011 A1* | 11/2018 | Kido | B41J 2/01 |
| 2020/0101758 A1* | 4/2020 | Okuda | B41J 2/2107 |

FOREIGN PATENT DOCUMENTS

| | | |
|---|---|---|
| JP | 2009-030014 A | 2/2009 |
| JP | 2017-031354 A | 2/2017 |
| JP | 2017-179263 A | 10/2017 |
| JP | 2017-179264 A | 10/2017 |
| JP | 2018-505244 A | 2/2018 |
| WO | WO 2011/013503 A | 2/2011 |
| WO | WO 2016/092312 | 6/2016 |

* cited by examiner

*Primary Examiner* — Manish S Shah
(74) *Attorney, Agent, or Firm* — Knobbe Martens Olson & Bear LLP

(57) ABSTRACT

A white ink containing a white pigment, a polycarbonate urethane resin, a polyether urethane resin, and water; and a recording method using the white ink. An ink set provided with the white ink and at least one color ink, the color ink being an aqueous ink containing a coloring agent, the white ink and the color ink differing in surface tension at 25° C. by ±0-3 mN/m; and a recording method using the ink set.

12 Claims, No Drawings

WHITE INK, INK SET, AND RECORDING METHOD

This application is the U.S. National Phase under 35 U.S.C. § 371 of International Application PCT/JP2019/012529, filed Mar. 25, 2019, designating the U.S., and published in Japanese as WO 2019/117075 on Jun. 20, 2019, which claims priority to Japanese Patent Application Nos. 2018-058047 and 2018-058049, both filed Mar. 26, 2018, the entire contents of which are incorporated herein by reference.

TECHNICAL FIELD

The present invention relates to a white ink, an ink set, and a recording method.

BACKGROUND ART

Conventionally, hand-drawing and screen printing methods have been considered mainstream as textile printing methods. However, recently, a printing method using an ink jet printer (ink jet printing method) has been often utilized.

Examples of coloring agents used in the ink jet printing method include water-soluble dyes. The water-soluble dyes have a mechanism in which a coloring agent permeates into a fiber to develop color, and has a sharp hue and a wide color range which can be reproduced. On the other hand, water-soluble dyes have drawbacks in that they have low lightfastness; they require steps such as fixing, washing, etc. after the dyes are attached to fibers; and they are complicated with regard to processing a dye waste liquid generated when washing and the like. For this reason, use of water-insoluble coloring agents instead of the water-soluble dyes has attracted attention.

In an ink jet printing method using a white pigment as the water-insoluble coloring agent, a method is generally known in which a white ink containing a white pigment is adhered to a fiber to form a white base, and then a color ink is further adhered to form a color image. In particular, when a color ink other than white is directly printed on a deep-colored fiber including black, the color of the color ink cannot be recognized by visual observation in some cases. For this reason, when printing is performed on a fiber having a color other than white with a color ink, a white base is usually formed.

When a color image is formed by adhesion of a color ink on a white base, color development of the color image decreases when the degree of whiteness of the base is low. For this reason, a higher degree of whiteness of the base is desired. In addition, a base formed on a recording material such as a fabric, which is a structure formed of a fiber, may suffer from a serious problem in that cracks may occur when the recording material is stretched. In addition, depending on the composition of a white ink, solid filling by the white ink may be poor, and the base may not be uniformly formed and unevenness may be observed in some cases. This unevenness of the white base also causes a problem that the quality of a color image to be formed thereafter is greatly reduced. Therefore, a white ink which can solve these problems is highly desired.

In addition, when a color image having a solid portion is formed by adhering a color ink on a white base, solid filling by the color ink may be poor depending on the combination of the white ink and the color ink. As a result, a color image containing a white streak is obtained in some cases. Therefore, an ink set capable of solving this problem is highly desired.

Patent Documents 1 and 2 discloses inks each containing a white pigment.

Patent Document 1: Japanese Unexamined Patent Application (Translation of PCT Application), Publication No. 2018-505244

Patent Document 2: Japanese Unexamined Patent Application, Publication No. 2017-31354

DISCLOSURE OF THE INVENTION

Problems to be Solved by the Invention

It is an object of the present invention to provide a white ink which has a high degree of whiteness, does not easily generate a crack even when a recording material is stretched, and can form a base with little unevenness, and a recording method using the white ink. Further, it is another object of the present invention to provide an ink set capable of forming a color image having good solid filling when a color ink is adhered to a base formed of the white ink, and a recording method using the ink set.

Means for Solving the Problems

Specific means for solving the above problems include the following embodiments.

A first aspect of the present invention relates to a white ink containing a white pigment, a polycarbonate urethane resin, a polyether urethane resin and water.

A second aspect of the present invention relates to the white ink as described in the first aspect, in which the white ink further contains a water-soluble organic solvent.

A third aspect of the present invention relates to the white ink as described in the first or second aspect, in which the white ink further contains a surfactant.

A fourth aspect of the present invention relates to the white ink as described in the third aspect, in which the surfactant is at least one selected from an acetylene glycol and a polyalkylene glycol.

A fifth aspect of the present invention relates to the white ink as described in any one of the first to fourth aspects, in which a total content of the polycarbonate urethane resin and the polyether urethane resin is 10 to 20% by mass.

A sixth aspect of the present invention relates to an ink set, including the white ink as described in any one of the first to fifth aspects and at least one type of color ink, in which the color ink is an aqueous ink containing a coloring agent other than the white pigment, and a difference in surface tension at 25° C. between the white ink and the color ink is ±0 to 3 mN/m.

A seventh aspect of the present invention relates to a recording method, in which recording is performed by adhering the white ink as described in any one of the first to fifth aspects to a recording material.

An eighth aspect of the present invention relates to the recording method as described in the seventh aspect, in which recording is performed by discharging the white ink using an ink jet printer and adhering the white ink to the recording material.

A ninth aspect of the present invention relates to a recording method, in which recording is performed by adhering each ink included in the ink set as described in the sixth aspect to a recording material.

A tenth aspect of the present invention relates to the recording method as described in the ninth aspect, in which recording is performed by discharging each ink included in the ink set using an ink jet printer and adhering the ink to the recording material.

An eleventh aspect of the present invention relates to the recording method as described in any one of the seventh to tenth aspects, in which the recording material is a fiber selected from the group consisting of polyester fibers, cellulose fibers, polyamide fibers, and natural fibers, blended fibers containing these fibers, or fabrics containing these fibers.

A twelfth aspect of the present invention relates to a fiber to which the white ink as described in any one of the first to fifth aspects is adhered.

A thirteenth aspect of the present invention relates to a fiber to which both the white ink and at least one type of color ink included in the ink set as described in the sixth aspect are adhered.

Effects of the Invention

According to the present invention, it is possible to provide a white ink which has a high degree of whiteness, hardly generates a crack even when the recording material is stretched, and which can form a base with little unevenness, and a recording method using the white ink. Further, according to the present invention, it is possible to provide an ink set capable of forming a color image having good solid filling when a color ink is adhered on a base formed of a white ink, and a recording method using the ink set.

PREFERRED MODE FOR CARRYING OUT THE INVENTION

In this specification, all of "parts" and "%" are described on a mass basis, including the Examples and the like, unless otherwise specified. Also, "C.I." refers to Color Index.
<White Ink>

The white ink according to the present embodiment contains a white pigment, a polycarbonate urethane resin, a polyether urethane resin, and water.
(White Pigment)

The white pigment is not particularly limited, and examples thereof include white inorganic pigments such as titanium oxide, zinc oxide, zinc sulfide, antimony oxide, zirconium oxide, etc.; and white organic pigments such as white hollow resin particles, polymer particles, etc.; and the like. Examples include C.I. Pigment White 1 (basic lead carbonate), C.I. Pigment White 4 (zinc oxide), C.I. Pigment White 5 (mixture of zinc sulfide and barium sulfate), C.I. Pigment White 6 (titanium oxide), C.I. Pigment White 6:1 (titanium oxide containing other metal oxides), C.I. Pigment White 7 (zinc sulfide), C.I. Pigment White 18 (calcium carbonate), C.I. Pigment White 19 (clay), C.I. Pigment White 20 (mica titanium), C.I. Pigment White 21 (barium sulfate), C.I. Pigment White 22 (naturally occurring barium sulfate), C.I. Pigment White 23 (gloss white), C.I. Pigment White 24 (alumina white), C.I. Pigment White 25 (gypsum), C.I. Pigment White 26 (oxide of magnesium and silicon), C.I. pigment white 27 (silica), C.I. pigment white 28 (anhydrous calcium silicate), etc.

Further, since surface-treated titanium oxide tends to be excellent in the chromogenic property and hiding property, titanium oxide surface-treated with silica or alumina can also be used. As a crystalline form of titanium oxide, a rutile is preferred. Examples thereof include Tipaque® R-580, R-670, R-780, R-850, R-855, CR-60 (manufactured by Ishihara Sangyo Kaisha Ltd.); JR-301, JR-403, JR-405, JR-804, JR-806, JR-600A, JR-800, etc. (manufactured by Tayca Corporation), etc.

The white pigment is also available as a dispersion (slurry) in an already dispersed state. Examples of such a dispersion include TF-5760 WHITE (D2B) (titanium oxide slurry manufactured by Dainichiseika Ltd., titanium oxide solid content: 60%, average particle diameter: 300 nm), and the like.

In addition, a white pigment in a solid state can be dispersed using a dispersant to obtain a dispersion. The dispersant is not particularly limited, and various known dispersants may be used depending on the purpose. Examples include styrene and derivatives thereof; vinylnaphthalene and derivatives thereof; aliphatic alcohol esters of $\alpha,\beta$-ethylenically unsaturated carboxylic acids; (meth)acrylic acid and derivatives thereof; maleic acid and derivatives thereof; itaconic acid and derivatives thereof; fumaric acid and derivatives thereof; copolymers composed of at least two monomers (preferably at least one of which is a hydrophilic monomer) selected from the group consisting of vinyl acetate, vinyl alcohol, vinyl pyrrolidone, (meth)acrylamide, and derivatives thereof; and the like. Examples of the copolymer include block copolymers, random copolymers, graft copolymers, and salts thereof.

In this specification, "(meth)acrylic acid" is used as a meaning including both "acrylic acid" and "methacrylic acid". In addition, "(meth)acrylamide" is used as a meaning including both "acrylamide" and "methacrylamide".

The dispersant can be either synthesized or is available as a commercial product. Specific examples of commercially available products include Joncryl 62, 67, 68, 678, 687 (all of which are styrene acrylic-based resins manufactured by Johnson Polymer Limited); Mowinyl S-100A (modified vinyl acetate resin manufactured by Hoechst Synthetic Corporation); Jurimer AT-210 (polyacrylic acid ester copolymer manufactured by Nihon Junyaku Co., Ltd.); and the like. Further, examples of an A-B block polymer include a dispersant disclosed, for example, in PCT International Publication No. WO 2013/115071.
(Polycarbonate Urethane Resins)

Examples of the polycarbonate urethane resin include a resin obtained by reacting a polyol or a polycarbonate polyol with a polyisocyanate. Among these, a resin obtained by reacting a polyol with a polyisocyanate is preferred.

The polyol is not particularly limited as long as it is a compound having two or more hydroxy groups in one molecule. Among them, alkane diols are preferred, C2 to C20 alkane diols are more preferred, C2 to C10 alkane diols are more preferred, and C4 to C6 alkane diols are particularly preferred. The alkane diol may be either linear, branched, or cyclic. Among them, linear or branched alkane diols are preferred. Examples thereof include ethylene glycol, propylene glycol, 1,3-propanediol, butanediol, pentanediol, hexanediol, 3-methyl-1,5-pentanediol, heptanediol, octanediol, undecanediol, dodecanediol, etc.

The polycarbonate polyol is not particularly limited, and examples thereof include a compound obtained by subjecting a carbonate ester and a polyol to a transesterification in the presence of a catalyst; a compound obtained by reacting phosgene with bisphenol A; etc. Examples of the carbonate ester include methyl carbonate, dimethyl carbonate, ethyl carbonate, diethyl carbonate, cyclocarbonate, diphenyl carbonate, etc. Examples of the polyol include low-molecular weight diol compounds such as ethylene glycol, diethylene glycol, 1,2-propylene glycol, dipropylene glycol, 1,4-butanediol, 1,5-pentanediol, 3-methyl-1,5-pentanediol, neopentylglycol, 1,4-cyclohexanediol, etc.; polyethylene glycol, polypropylene glycol; and the like.

The polyisocyanate is not particularly limited and can be appropriately selected depending on the purpose. Examples include aromatic polyisocyanate compounds such as 1,3-phenylenediisocyanate, 1,4-phenylenediisocyanate, 2,4-tolylenediisocyanate (TDI), 2,6-tolylenediisocyanate, 4,4'-diphenylmethane diisocyanate (MDI), 2,4-diphenylmethane diisocyanate, 4,4'-diisocyanatobiphenyl, 3,3'-dimethyl-4,4'-diisocyanatobiphenyl, 3,3'-dimethyl-4,4'-diisocyanatodiphenylmethane, 1,5-naphthylene diisocyanate, m-isocyanatophenylsulfonyl isocyanate, p-isocyanatophenylsulphonyl isocyanate, etc; aliphatic polyisocyanate compounds such as ethylene diisocyanate, tetramethylene diisocyante, hexamethylene diisocyanate (HDI), dodecamethylene diisocyanate, 1,6,11-undecane triisocyanate, 2,2,4-trimethylhexamethylene diisocyanate, lysine diisocyanate, 2,6-diisocyanatomethylcaproate, bis(2-isocyanatoethyl) fumarate, bis(2-isocyanatoethyl) carbonate, 2-isocyanatoethyl-2,6-diisocyanatohexanoate, etc.; alicyclic diisocyanate compounds such as isophorone diisocyanate (IPDI), 4,4'-dicyclohexylmethane diisocyanate (hydrogenated MDI), cyclohexylene diisocyanate, methylcyclohexylene diisocyanate (hydrogenated TDI), bis(2-isocyanatoethyl)-4-dichlorohexen-1,2-dicarboxylate, 2,5-norbornane diisocyanate, 2,6-norbornane diisocyanate, etc.; and the like. Among these, the alicyclic diisocyanates are preferred.

Commercial products of the polycarbonate urethane resin include UCOAT UX-320, 390, PERMARIN UA-368 (manufactured by Sanyo Chemical Industries, Ltd.), HYDRAN WLS-201 (manufactured by DIC Corporation), and the like.

(Polyether Urethane Resins)

Examples of the polyether urethane resin include a resin obtained by reacting a polyether having two hydroxy groups in its molecule with a polyisocyanate. Among these, examples of the polyisocyanate include the same polyisocyanates described in the section of the polycarbonate urethane resins, including preferred ones and the like.

Examples of the polyether having two hydroxy groups in the molecule include poly (oxyalkylene) glycol. The poly (oxyalkylene) glycol may be any of linear, branched, or cyclic, and is preferably linear or branched, and more preferably linear. The number of carbon atoms of the alkylene moiety is typically C2 to C12, preferably C2 to C10, more preferably C2 to C8, more preferably C2 to C6, and particularly preferably C4 to C6. When a plurality of alkylene moieties are present, the number of carbon atoms of their alkylene may be the same or different. The number of repeats of "oxyalkylene" in the poly (oxyalkylene) glycol is typically 2 to 40, preferably 2 to 30, more preferably 2 to 20, and most preferably 2 to 15.

Commercially available products of the polyether urethane resin include NeoRez R-967 (Kusumoto Chemicals, Ltd.), PERMARIN UA-150 (Sanyo Chemical Industries, Ltd.), and the like.

(Water)

As water, water containing few impurities such as metal ions and inorganic salts is preferably used. Examples of such water include ion-exchanged water, distilled water, etc.

(Water-Soluble Organic Solvents)

It is preferable that the white ink according to the present embodiment further contains a water-soluble organic solvent. Water-soluble organic solvent is not particularly limited, and examples thereof include polyhydric alcohols, pyrrolidones, etc.

Examples of the polyhydric alcohols include C3 to C6 polyhydric alcohols having two or three hydroxy groups; polyalkylene glycols having two or more repeating units and having a molecular weight of about 20,000 or less, preferably a liquid polyalkylene glycol, more preferably a poly C2 to C4 alkylene glycol, and most preferably a poly C2 to C3 alkylene glycol; alkyl ethers of polyalkylene glycols, preferably monoalkyl ethers of polyalkylene glycols; alkylene oxide adducts of glycerin; alkylene oxide adducts of diglycerin; and the like.

Examples of the C3 to C6 polyhydric alcohols having two or three hydroxy groups include glycerin, propylene glycol, 1,3-propanediol, 1,2-butanediol, 1,4-butanediol, 1,2-pentanediol, 1,3-pentanediol, 1,5-pentanediol, 1,2-hexanediol, 1,6-hexanediol, etc.

Examples of the polyalkylene glycol having two or more repeating units and having a molecular weight of about 20,000 or less include diethylene glycol, triethylene glycol, and polyethylene glycol (PEG200, PEG400, PEG800 and the like); dipropylene glycol, tripropylene glycol, and polypropylene glycol; UNILUB 50TG-32 (manufactured by NOF Corporation), etc.

Examples of the alkyl ethers of polyalkylene glycols, include a compound in which the hydroxy group of the polyalkylene glycol described above is substituted with an alkyl group. Examples of the alkyl group include linear, branched, or cyclic alkyl groups. Among these, a linear or branched alkyl group is preferred, and a linear alkyl group is more preferred. The number of carbon atoms of the alkyl group is typically C1 to C6, and is preferably C1 to C4. As an example, butyl diglycol or the like can be mentioned.

Examples of the alkylene oxide in alkylene oxide adducts of glycerin typically include a C2 to C4 alkylene oxide, and preferably C2 to C3 alkylene oxide. The mass average molecular weight of these compounds is typically from 300 to 5,000, and preferably from 340 to 4,500. A mass average molecular weight can be measured by GPC (gel permeation chromatography). Examples of commercially available products include SANNIX GP Series (manufactured by Sanyo Chemical Industries, Ltd.); BLAUNON GL Series (manufactured by Aoki Oil Industry Co., Ltd.); WILBRIDE S-753 (manufactured by NOF Corporation); and the like.

Examples of the alkylene oxide in the alkylene oxide adducts of diglycerin include typically a C2 to C4 alkylene oxide, and preferably a C2 to C3 alkylene oxide. The mass average molecular weight of these compounds is typically from 300 to 5,000, and preferably from 340 to 4,500. Examples of commercially available products include SC-P400, SC-P750, SC-P1000, SC-P1200, SC-P1600; SC-E450, SC-E750, SC-E1000, SC-E1500, SC-E2000, SC-E3000 and SC-E4500 (manufactured by Sakamoto Yakuhin Kogyo Co., Ltd.); UNIBLU DGP-700 and DGP-700F (manufactured by NOF Corporation); and the like.

Examples of the pyrrolidones include 2-pyrrolidone, N-methyl-2-pyrrolidone, etc.

(Surfactants)

It is preferable that the white ink according to the present embodiment further contains a surfactant. By containing a surfactant, increase in viscosity of white ink, cohesion of components, and the like are suppressed, and storage stability becomes good. The type of surfactant is not particularly limited, but for example, at least one type of surfactant selected from acetylene glycols and polyalkylene glycols is preferred. Among these, when a polyalkylene glycol is used, the degree of whiteness and pass through tend to be good.

As the acetylene glycol surfactant, for example, a surfactant selected from 2,4,7,9-tetramethyl-5-decyne-4,7-diol, 2,4,7,9-tetramethyl-5-decyne-4,7-diol, 2,4-dimethyl-5-decyn-4-ol, 2,4-dimethyl-5-decyn-4-ol, or an alkylene oxide adduct thereof is preferred. Examples of the alkylene oxide include linear, branched, or cyclic alkylene oxides of C2 to C4. Among these, a linear or branched alkylene oxide is preferred. Also, those comprising an ether, e.g., 2,5,8,11-tetraethyl-6-dodecyne-5,8-diol ethoxylate, may be used. Examples of commercially available products include Olfine series such as Olfine 104, 104PG50, E1010, etc. (manufactured by Air Products Co., Ltd.); Dynol series such as Dynol 604, 607, etc. (manufactured by Air Products Co., Ltd.); and Surfynol series such as Surfynol 440, 465, 61, etc. (manufactured by Nissin Chemical Industry Co., Ltd.).

As the polyalkylene glycol surfactant, for example, a surfactant selected from polyoxyethylene alkyl ethers, fatty acid ethylene oxide adducts, higher alkylamine ethylene oxide adducts, and polyoxyalkylene glycols (preferably polyoxy C2 to C4 alkylene glycols, more preferably polyoxyethylene polyoxypropylene glycol) is preferred. Among these, polyoxyalkylene glycols are preferred.

Examples of the polyoxyethylene alkyl ether include polyoxyalkylene branched decyl ether, polyoxyalkylene tridecyl ether, polyoxyethylene isodecyl ether, polyoxyalkylene lauryl ether, etc. Examples of commercially available products include Noigen XL-40, 50, 60, 70, 80, 100, 140 and 160, Noigen TDS-30, 50, 70, 80, 90, 100 and 120, Hytenol LA-10, LA-12, LA-16, PS-06, PS-15 (manufactured by DKS Co., Ltd.), and the like.

Examples of the fatty acid ethylene oxide adduct include a stearic acid ethylene oxide adduct and a polyethylene glycol laurate ester, etc. Examples of commercially available products include Emanorn 1112, 3199V, 3299V, 3299VR, 3201M-V (manufactured by Kao Corporation) and the like.

Commercial products of the higher alkylamine ethylene oxide adducts include AMIET 102, 105, 105A, 302 and 320 (manufactured by Kao Corporation), etc.

Commercially available products of the polyoxyalkylene glycols include EMULGEN PP-290 (a 160/30 copolymer of polyethylene glycol/polypropylene glycol, manufactured by Kao Corporation); NEWPOL PE-61, PE-62, PE-64, PE-68, PE-71, PE-74, PE-75, PE-78 and PE-108 (polyoxyethylene polyoxypropylene block polymer, manufactured by Sanyo Chemical Industries, Ltd.); EPAN 410, 420, 450, 485, 680, 710, 720, 740, 750, 785, U-103, U-105 and U-108 (polyoxyethylene polyoxypropylene glycol manufactured by DKS Co., Ltd., having a weight-average molecular weight of polypropylene glycol of about 950 to 4,000 and a content of polyoxyethylene of about 5 to 95%); and the like.

(Ink Preparation Agents)

The white ink according to the present embodiment may further contain an ink preparation agent other than the above, if necessary. Examples of the ink preparation agent include an antifungal agent, an antiseptic agent, a pH adjusting agent, a chelating agent, a rust preventive agent, a water-soluble ultraviolet absorbing agent, a water-soluble polymer compound, an antioxidant, etc.

Examples of the antifungal agent include sodium dehydroacetate, sodium benzoate, sodium pyridinethione-1-oxide, ethyl p-hydroxybenzoate, 1,2-benzisothiazolin-3-one, and salts thereof, etc.

Examples of the antiseptic agent include organic sulfur-based, organic nitrogen sulfur-based, organic halogen-based, haloarylsulfone-based, iodopropagyl-based, haloalkylthio-based, nitrile-based, pyridine-based, 8-oxyquinoline-based, benzothiazole-based, isothiazoline-based, dithiol-based, pyridine oxide-based, nitropropane-based, organotin-based, phenol-based, quaternary ammonium salt-based, triazine-based, thiazine-based, anilide-based, adamantane-based, dithiocarbamate-based, brominated indanone-based, benzylbromoacetate-based, and inorganic salt-based compounds and the like. Examples of the organic halogen-based compound include sodium pentachlorophenolate. Examples of the pyridine oxide-based compound include 2-pyridinethiol-1-oxide sodium salt. Examples of the isothiazoline-based compound include 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, 5-chloro-2-methyl-4-isothiazolin-3-one calcium chloride, 2-methyl-4-isothiazolin-3-one calcium chloride, etc.

Examples of the other antiseptic and antifungal agent include sodium acetate anhydrous, sodium sorbate, sodium benzoate and Proxel GXL (S) and Proxel XL-2 (S), trade names of products manufactured by Arch Chemicals Inc.

As the pH adjusting agent, any substance can be used as long as the pH of the ink can be controlled, for example, in a range of 5 to 11 without adversely affecting the ink to be prepared. Examples of the pH adjusting agent include alkali metal hydroxides, alkaline earth metal hydroxides, aliphatic amine compounds, and alcohol amine compounds. Examples of the alkali metal hydroxide include lithium hydroxide, sodium hydroxide, potassium hydroxide, and the like. Examples of the hydroxide of the alkaline earth metal hydroxide include beryllium hydroxide, magnesium hydroxide, calcium hydroxide, and strontium hydroxide. Among these, alkali metal hydroxides are preferred, and lithium hydroxide and sodium hydroxide are more preferred. Examples of the aliphatic amine compound include ammonia, monomethylamine, dimethylamine, trimethylamine, monoethylamine, dimethylamine, trimethylamine, etc. The aliphatic amine is preferably ammonia or triethylamine. Examples of the alcohol amine compound include monoethanolamine, diethanolamine, triethanolamine, monopropanolamine, dipropanolamine, tripropanolamine, methylethanolamine, dimethylethanolamine, N-methyldiethanolamine, and the like. The alcohol amine is preferably a tertiary amine, and more preferably triethanolamine. The other examples include alkali metal carbonates such as lithium carbonate, sodium carbonate, sodium hydrogen carbonate, potassium carbonate, etc.; alkali metal salts of organic acids such as sodium silicate, potassium acetate, etc.; phosphates such as disodium phosphate; and the like.

Examples of the chelating agent include disodium ethylenediamine tetraacetate, sodium nitrilotriacetate, sodium hydroxyethyl ethylenediamine triacetate, sodium diethylenetriamine pentaacetate, sodium uracil diacetate, and the like.

Examples of the rust preventive agent include acidic sulfites, sodium thiosulfate, ammonium thioglycolate, diisopropylammonium nitrite, pentaerythritol tetranitrate, dicyclohexylammonium nitrite, etc.

Examples of the water-soluble ultraviolet absorbing agent include sulfonated benzophenone-based compounds, benzotriazol-based compounds, salicylic acid-based compounds, cinnamic acid-based compounds, triazine-based compounds, etc.

Examples of the water-soluble polymer compound include polyvinyl alcohol, cellulose derivatives, polyamines, polyimines, etc.

As the antioxidant, for example, various organic and metal complex-based anti-fading agents can be used. Examples of the organic anti-fading agent include hydroquinones, alkoxyphenols, dialkoxyphenols, phenols, anilines, amines, indanes, chromans, alkoxyanilines, heterocycles, etc.

(Content Ratio of Each Component)

One type of the above-described components may be used alone, and two or more types thereof may be used in combination. The content ratio of each component in the total mass of the white ink according to the present embodiment (when two or more types of compounds are contained, the sum thereof) is, for example, as follows. Note that, the balance other than these is water.

White Pigment: typically, 1 to 30%, preferably 5 to 20% and more preferably 5 to 15%.
Polycarbonate urethane resin: typically, 1 to 30%, preferably 5 to 20% and more preferably 5 to 15%.
Polyether urethane resin: typically, 1 to 30%, preferably 1 to 20% and more preferably 1 to 15%.
Water-soluble organic solvent: typically, 0 to 50%, preferably 15 to 35% and more preferably 20 to 30%.
Surfactant: typically, 0 to 5%, preferably 0.2 to 2% and more preferably 0.5 to 1%.
Ink preparation agent: typically, 0 to 5%, preferably 0.2 to 2% and more preferably 0.5 to 1%.

The total content of the polycarbonate urethane resin and the polyether urethane resin is preferably 10 to 20% by mass.

When the white ink according to the present embodiment contains a dispersant, the content of the dispersant relative to 1 part of the white pigment is typically 0.1 to 1 part, preferably 0.1 to 0.6 parts and more preferably 0.2 to 0.5 parts.

(Preparation Method of White Inks)

The method for preparing a white ink according to the present embodiment is not particularly limited, and a known preparation method can be employed. As an example thereof, a method of preparing a white ink by adding and stirring the respective components is mentioned. In addition, when a white pigment having no self-dispersibility is used, a method in which the white pigment, a dispersant, and water are first mixed to prepare a dispersion, and then the remaining respective components are added and stirred can be employed. The obtained white ink may be subjected to microfiltration by a known method if necessary, and solid impurities may be filtered off. For example, when the white ink according to the present embodiment is ejected by an ink jet printer, it is preferable to perform microfiltration.

The white ink according to the present embodiment has a high degree of whiteness, does not easily generate a crack even when the recording material is stretched, and can form a base having little unevenness, and therefore is extremely useful as an ink for forming a white base, above all, as a white ink for a fiber.

As an effect other than the above, the white ink according to the present embodiment can suppress fluffing of fibers to which the white ink adheres. Therefore, when an image is printed on a pretreated fiber, an image having excellent sharpness can be obtained. Further, it is possible to improve scratch resistance and washing fastness of the recorded image.

<Recording Method>

In the recording method according to the present embodiment using the white ink described above, recording is performed by adhering the above-described white ink to a recording material. A method of adhering the white ink to a recording material is not particularly limited, and a brush pen, a brush, a roll coater, a bar coater, an ink jet printer, or the like can be used depending on the purpose. When an ink jet printer is used, recording can be performed by discharging a white ink by the ink jet printer and adhering it to a recording material.

Although there is no particular limitation on the recording material, a fiber, a fabric which is a structure formed of the fiber, and the like are preferred.

The type of fiber is not particularly limited. Examples thereof include fibers selected from the group consisting of polyesters, celluloses, polyamides, and natural fibers, or blended fibers thereof. Examples of the polyester fiber include fibers containing polyethylene terephthalate as a main component. Examples of the cellulose fiber include cotton, rayon, triacetate fibers, diacetate fibers, etc. Examples of the polyamide fiber include nylon fibers and the like. Examples of the natural fiber include silk, wool, etc.

The fiber may be provided with an ink receiving layer (bleeding prevention layer). A method of providing an ink receiving layer on the fiber is known, and such a fiber can be purchased as a commercially available product. Further, it is also possible to appropriately select constituent components, a forming method, and the like from known techniques and provide the ink receiving layer on the fiber. The ink receiving layer is not particularly limited as long as it has a function therefor.

The color of a fiber includes all dark and light colors. It is also possible to attach a white ink to a white fiber if necessary.

After attaching a white ink to a fiber, the fiber can be dried, if necessary. The drying of the fiber can be carried out typically at room temperature (about 25° C.) to 200° C., preferably at room temperature to about 180° C., for several minutes. By setting the drying temperature to 110° C. or higher, the fixing property of the ink to the fiber tends to be good. Further, by setting the heating temperature to 200° C. or less, deterioration due to heat of the components contained in the fiber and the white ink can be prevented.

<Ink Set>

The ink set according to the present embodiment includes a white ink and at least one type of color ink, in which the at least one color ink is an aqueous ink containing a coloring agent other than the white pigment, and the difference in surface tension between the white ink and the color ink at 25° C. is ±0 to 3 mN/m. The difference in surface tension is preferably ±0 to 2.5 mN/m, more preferably ±0 to 2 mN/m. Typically, the surface tension of the white ink is equivalent to or greater than that of the color ink.

In this specification, the surface tension at 25° C. of each ink is measured by a plate method using a CBVP-Z type surface tension meter manufactured by Kyowa Interface Science Co., Ltd. The first decimal place of each of the obtained measurement values is rounded off, and this is taken as a surface tension of each ink.

There is no particular limitation on the type of color ink included in the ink set according to the present embodiment. For example, an ink set may comprise four color inks of yellow, red, blue and black in addition to the white ink. Further, if necessary, the ink set may further comprise at least one type of color ink such as a green, violet, orange, or brown ink in addition to the above four colors.

[White Ink]

Since the white ink provided in the ink set according to the present embodiment is as described above, a detailed description thereof is omitted.

The surface tension at 25° C. of the white ink is typically 31 to 35 mN/m, preferably 32 to 34 mN/m.

[Color Inks]

The color ink is not particularly limited as long as it is an aqueous ink containing a coloring agent other than the white pigment. Examples of the coloring agent include known dyes and pigments. Among them, a coloring agent having a C.I. number assigned thereto is preferred, and a water-insoluble coloring agent is more preferred. As water, water containing few impurities such as metal ions or inorganic salts is preferably used. Examples of such water include ion-exchanged water, distilled water, etc.

(Water-Insoluble Coloring Agents)

In this specification, the water-insoluble coloring agent refers to a coloring agent having a solubility in water at 25° C. of typically 3 g/L or less, preferably 1 g/L or less, more preferably 500 mg/L or less, and most preferably 100 mg/L or less. As such a coloring agent, coloring agents selected from C.I. Disperse, C.I. Solvent and pigments can be used. Among these, pigments are preferred. Examples of the pigments include inorganic pigments, organic pigment, and extender pigments.

Examples of the inorganic pigments include carbon black, metal oxides, metal hydroxides, metal sulfides, metal ferrocyanides, and metal chlorides. Among these, carbon black is preferred as the black pigment. Examples of the carbon black include thermal black, acetylene black, oil furnace black, gas furnace black, lamp black, gas black, channel black, etc. Among these, acetylene black, oil furnace black, gas furnace black, lamp black, and channel black are preferred. Examples of commercially available products include Raven series (manufactured by Columbia Carbon); Monarch series, Regal series and Mogul series (manufactured by Cabot Corporation); Color Black series, Printex series and Special Black series (manufactured by Degussa AG); MA series and MCF series (manufactured by Mitsubishi Chemical Corporation); and the like.

Examples of the organic pigment include azo pigments having at least one azo group in the molecule, phthalocyanine pigments, quinacridone pigments, isoindolinone pigments, dioxazine pigments, perylene pigments, perinone pigments, thioindigo pigments, anthraquinone pigments and quinophthalone pigments. Among these, pigments selected from C.I. pigments are preferred. Examples include C.I. Pigment Yellow 1, 2, 3, 12, 13, 14, 16, 17, 24, 55, 73, 74, 75, 83, 93, 94, 95, 97, 98, 108, 114, 128, 129, 138, 139, 150, 151, 154, 155, 180, 185, 193, 199 and 202; C.I. Pigment Red 5, 7, 12, 48, 48:1, 57, 88, 112, 122, 123, 146, 149, 150, 166, 168, 177, 178, 179, 184, 185, 202, 206, 207, 254, 255, 257, 260, 264 and 272; C.I. Pigment Blue 1, 2, 3, 15, 15:1, 15:2, 15:3, 15:4, 15:6, 16, 22, 25, 60, 66 and 80; C.I. Pigment Violet 19, 23, 29, 37, 38 and 50; C.I. Pigment Orange 13, 16, 34, 36, 43, 68, 69, 71 and 73; C.I. Pigment Green 7, 36 and 54; C.I. Pigment Black 1 and 7; and the like.

Examples of the extender pigment include silica, calcium carbonate, talc, clay, barium sulfate, white carbon, etc.

As the water-insoluble coloring agent, a pigment selected from the C.I. pigments and the carbon blacks among the above is preferred, and a pigment selected from C.I. Pigment Yellows, C.I. Pigment Reds, C.I. Pigment Blues, C.I. Pigment Violets, C.I. Pigment Oranges, and C.I. Pigment Greens is more preferred.

As the water-insoluble coloring agent, a single type of coloring agent is typically used. However, two or more types of coloring agents may be used in combination as needed. Examples thereof include a combined use of an organic pigment and an extender pigment; that of an organic pigment and an inorganic pigment; and the like. Further, for improving fluidity, an extender pigment may be further used in combination in addition to the organic pigment and the inorganic pigment. Moreover, two or more types of coloring agents selected from the inorganic pigments and the organic pigments may be used in combination for hue adjustment of the dyed material. The hue adjustment is carried out for the purpose of obtaining a dyed material having a shade; expanding the color range of the dyeing; etc. For such purposes, several types of organic pigments can be used in combination in order to adjust the dyed material to a desired hue.

(Dispersants)

When the color ink contains a water-insoluble coloring agent, it is preferable to further contain a dispersant.

The dispersant is not particularly limited, but an A-B block polymer is preferred. The A-B block polymer is obtained by copolymerization by a living radical polymerization method using, as a polymerization initiator, any one of a mixture of an organotellurium compound represented by the following formula (1) and an organoditellurium compound represented by the following formula (2), and a mixture of an organotellurium compound represented by the following formula (1), an azo-based polymerization initiator and an organoditellurium compound represented by the following formula (2). Note that the A-B block polymer refers to a polymer in which the A polymer and the B polymer are chemically bonded, and the A polymer is obtained by polymerizing monomers that differ to those used to obtain the B polymer.

(1)

In the formula (1), $R^1$ represents a C1 to C8 alkyl group, an aryl group, a substituted aryl group, or an aromatic heterocyclic group. $R^2$ and $R^3$ each independently represents a hydrogen atom or a C1 to C8 alkyl group. $R^4$ represents an aryl group, a substituted aryl group, an aromatic heterocyclic group, an acyl group, an amide group, an oxycarbonyl group, or a cyano group.

(2)

In the formula (2), $R^1$ is as defined for $R^1$ in the formula (1).

In the formula (1), examples of the C1 to C8 alkyl group in $R^1$ include linear, branched, or cyclic alkyl groups having 1 to 8 carbon atoms, such as a methyl group, an ethyl group, a n-propyl group, an isopropyl group, a cyclopropyl group, a n-butyl group, a sec-butyl group, a tert-butyl group, a cyclobutyl group, a n-pentyl group, a n-hexyl group, a n-heptyl group, a n-octyl group, etc. $R^1$ is preferably a linear or branched alkyl group having 1 to 4 carbon atoms, and more preferably a methyl group, an ethyl group, or an n-butyl group. Examples of the aryl group in $R^1$ include a phenyl group and a naphthyl group, and preferably a phenyl group. Examples of the substituted aryl group in $R^1$ include a phenyl group having a substituent and a naphthyl group having a substituent. Examples of the substituent include halogen atoms, a hydroxy group, alkoxy groups, amino groups, nitro groups, a cyano group, a carbonyl-containing group represented by —CORa (Ra represents C1 to C8 alkyl groups, aryl groups, C1 to C8 alkoxy groups, or aryloxy groups), a sulfonyl group, a trifluoromethyl group, etc. Among these, a trifluoromethyl group is preferred. The number of these substituents is typically one or two. When the aryl group is a phenyl group, it is preferable to have a substituent at the para or ortho position. Examples of the aromatic heterocyclic group in $R^1$ include a pyridyl group, a pyrrole group, a furyl group, a thienyl group, etc.

In the formula (1), examples of the C1 to C8 alkyl group in $R^2$ or $R^3$ include the same groups as those indicated for the C1 to C8 group in $R^1$.

In the formula (1), examples of the aryl group, the substituted aryl group, and the aromatic heterocyclic group in $R^4$ include the same groups as those indicated for $R^1$. Examples of the acyl group in $R^4$ include a formyl group, an acetyl group, a benzoyl group, etc. Examples of the amide group in $R^4$ include carboxylic acid amide groups such as an acetamide group, a malonamide group, a succinic amide group, a malenamide group, a benzamide group, 2-furamide group, etc.; thioamide groups, such as a thioacetamide group, a hexanedithioamide group, a thiobenzamide group, a methanethiosulfonamide group, etc.; selenoamide groups, such as a selenoacetamide group, a hexane diselenoamide group, a selenobenzamide group, and a methaneselenosulfonamide group, etc.; N-substituted amide groups such as N-methylacetamide group, a benzanilide group, a cyclohexanecarboxanilide group, 2,4'-dichloroacetanilide group, etc. Examples of the oxycarbonyl group in $R^4$ include a group represented by —COORb (Rb represents a hydrogen atom, a C1 to C8 alkyl group, or an aryl group). Examples thereof include a carboxy group, a methoxycarbonyl group, an ethoxycarbonyl group, a propoxycarbonyl group, a n-butoxycarbonyl group, a sec-butoxycarbonyl group, a tert-butoxycarbonyl group, a n-pentoxycarbonyl group, a phenoxycarbonyl group, etc. Among these, a methoxycarbonyl group and an ethoxycarbonyl group are preferred.

Preferred examples of the organotellurium compound represented by the formula (1) include those in which $R^1$ is a C1 to C4 alkyl group, $R^2$ and $R^3$ are each independently a hydrogen atom or a C1 to C4 alkyl group, and $R^4$ is an aryl group, a substituted aryl group, or an oxycarbonyl group. More preferred examples include those in which $R^1$ is a C1 to C4 alkyl group, $R^2$ and $R^3$ are each independently a hydrogen atom or a C1 to C4 alkyl group, and $R^4$ is a phenyl group, a substituted phenyl group, a methoxycarbonyl group, or an ethoxycarbonyl group.

Examples of the organotellurium compound represented by the formula (1) include (methyltellanylmethyl)benzene, (1-methyltellanylethyl) benzene, 1-chloro-4-(1-methyltellanylethyl)benzene, 1-trifluoromethyl-4-(1-methyltellanylethyl)benzene, 3,5-bis-trifluoromethyl-1-(1-methyltellanylethyl)benzene, 1,2,3,4,5-pentafluoro-6-(1-methyltellanylethyl)benzene, 2-methyltellanylpropionitrile, (2-methyltellanylpropyl)benzene, methyl 2-methyltellanyl-2-methyl-propionate, ethyl 2-methyltellanyl-2-methyl-propionate, 2-methyltellanyl-2-methyl-propionitrile, etc. All compounds in which the methyltellanyl moiety of the above compounds is changed to ethyltellanyl, n-butyltellanyl, n-octyltellanyl, or the like are also included. In addition, all of the organotellurium compounds disclosed in WO 2004/014962 (line 25 on page 4 to line 18 on page 7) can be exemplified.

The organotellurium compound represented by the formula (1) enables a polymer having a desired number average molecular weight to be obtained by appropriately adjusting an amount thereof to be used. A preferable amount to be used is approximately a value obtained by dividing the mass (unit is gram) of a raw vinyl monomer by the number average molecular weight of the target polymer (a unit of the amount to be used is the number of moles), and it is preferable to use an amount of about 0.3 to 3 times the value in some cases.

Note that, depending on the type of vinyl-based monomer to be polymerized, a ditellurium compound represented by the formula (2) may be further added in addition to the organotellurium compound represented by the formula (1) to be used as a polymerization initiator.

Examples of the ditellurium compound represented by the formula (2) include dimethyl ditelluride, diethyl ditelluride, di-n-propyl ditelluride, diisopropyl ditelluride, dicyclopropyl ditelluride, di-n-butyl ditelluride, di-sec-butyl ditelluride, di-tert-butyl telluride, dicyclobutyl telluride, diphenyl ditelluride, bis-(p-methoxyphenyl) ditelluride, bis-(p-aminophenyl) ditelluride, bis-(p-nitrophenyl) ditelluride, bis-(p-cyanophenyl) ditelluride, bis-(p-sulfonylphenyl) ditelluride, dinaphthyl ditelluride, dipyridyl ditelluride, and the like. Among these, dimethyl ditelluride, diethyl ditelluride, di-n-propyl ditelluride, di-n-butyl ditelluride, and diphenyl ditelluride are preferred, and dimethyl ditelluride, diethyl ditelluride, di-n-propyl ditelluride, and di-n-butyl ditelluride are more preferred.

In the case in which the ditellurium compound represented by the formula (2) is used, an amount to be used is typically 0.01 to 100 mol, preferably 0.1 to 10 mol, and more preferably 0.1 to 5 mol, given that the total amount of the organotellurium compound represented by the formula (1) is 1 mol.

As the polymerization initiator, an azo-based polymerization initiator may be used in addition to the above-mentioned organotellurium compound. Although the azo-based polymerization initiator is not particularly limited as long as it is an initiator used in general radical polymerization, examples thereof include 2,2'-azobis(isobutyronitrile) (AIBN), 2,2'-azobis(2-methylbutyronitrile) (AMBN), 2,2'-azobis(2,4-dimethylvaleronitrile) (ADVN), 1,1'-azobis(1-cyclohexanecarbonitrile) (ACHN), dimethyl-2,2'-azobisisobutyrate (MAIB), 4,4'-azobis(4-cyanovaleric acid) (ACVA), 1,1'-azobis(1-acetoxy-1-phenylethane), 2,2'-azobis(2-methylbutylamide), 2,2'-azobis(4-methoxy-2,4-dimethylvaleronitrile), 2,2'-azobis(2-methylamidinopropane) dihydrochloride, 2,2'-azobis[2-(2-imidazolin-2-yl)propane], 2,2'-azobis[2-methyl-N-(2-hydroxyethyl)propionamide], 2,2'-azobis(2,4,4-trimethylpentane), 2-cyano-2-propylazoformamide, 2,2'-azobis(N-butyl-2-methylpropionamide), 2,2'-azobis(N-cyclohexyl-2-methylpropionamide), and the like.

It is preferred to appropriately select these azo-based polymerization initiators, depending on the reaction conditions. For example, it is preferable to use 2,2'-azobis(2,4-dimethylvaleronitrile) (ADVN) or 2,2'-azobis(4-methoxy-2,4-dimethylvaleronitrile) in the case of low-temperature polymerization (40° C. or lower), 2,2'-azobis(isobutyronitrile) (AIBN), 2,2'-azobis(2-methylbutyronitrile) (AMBN), dimethyl-2,2'-azobisisobutyrate (MAIB), or 1,1'-azobis(1-acetoxy-1-phenylethane) in the case of moderate-temperature polymerization (40 to 80° C.), or 1,1'-azobis(1-cyclohexanecarbonitrile) (ACHN), 2-cyano-2-propylazoformamide, 2,2'-azobis(N-butyl-2-methylpropionamide), 2,2'-azobis(N-cyclohexyl-2-methylpropionamide), or 2,2'-azobis(2,4,4-trimethylpentane) in the case of high-temperature polymerization (80° C. or higher). In addition, in the reaction using an aqueous solvent, it is preferable to use 4,4'-azobis(4-cyanovaleric acid) (ACVA), 2,2'-azobis(2-methylbutylamide), 2,2'-azobis(2-methylamidinopropane)

dihydrochloride, 2,2'-azobis[2-(2-imidazolin-2-yl)propane], or 2,2'-azobis[2-methyl-N-(2-hydroxyethyl)propionamide].

In the case in which the azo-based polymerization initiator is used, it is desirable that the azo-based polymerization initiator be used in an amount of preferably 0.01 to 100 mol, more preferably 0.1 to 10 mol, and most preferably 0.1 to 5 mol, given that the total amount of the organic tellurium compound of the formula (1) is 1 mol.

When the dispersion agent is prepared using any one of the mixture of an organic tellurium compound represented by the formula (1) and an organic ditellurium compound represented by the formula (2) or the mixture of an organic tellurium compound represented by the formula (1), an azo-based polymerization initiator and an organic ditellurium compound represented by the formula (2), as a polymerization initiator, the prepared dispersion agent contains an organotellurium compound. Therefore, the total amount of tellurium in the dispersion agent can be measured using a known metal measuring method such as an ICP emission analysis method or an atomic absorption method.

As the dispersion agent (A-B block copolymer), it is preferred that the monomer constituting the A block is at least one monomer represented by the following formula (3) and the monomer constituting the B block is benzyl methacrylate and/or benzyl acrylate.

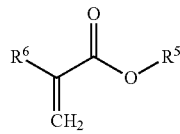

(3)

In the formula (3), $R^5$ represents a hydrogen atom or an alkyl group which may have a branching of four carbon atoms, and $R^6$ represents a hydrogen atom or a methyl group.

Among the monomers represented by the formula (3), a monomer in which $R^5$ is a hydrogen atom and $R^6$ is a methyl group; or a monomer in which $R^5$ is a n-butyl group and $R^6$ is a methyl group is preferred. Further, it is more preferred to use these two types of monomers in combination.

The monomer configuring block B is at least one type of monomer selected from benzyl methacrylate and benzyl acrylate, and is preferably benzyl methacrylate.

The acid value of the dispersant is typically from 90 to 200 mgKOH/g, preferably from 100 to 150 mgKOH/g and more preferably from 100 to 120 mgKOH/g. By setting the acid value to such a range, dispersibility in water or a mixture of water-soluble organic solvent and water becomes good, and color development when the recording material is colored tends to be improved.

The weight average molecular weight of the dispersant is preferably from 10,000 to 60,000, more preferably from 10,000 to 40,000, and most preferably from 15,000 to 30,000. By setting a mass average molecular weight to such a range, the stability of the dispersion tends to be improved.

A ratio of an used amount of the dispersant to the total amount of the coloring agent is preferably from 0.1 to 1, more preferably from 0.1 to 0.6, and most preferably from 0.2 to 0.4, on a mass basis. By setting the used amount to this range, the stability of the dispersion becomes good, and the image quality of the recorded image tends to be improved.

For the purpose of uniformly dispersing the dispersant in water, a neutralizing agent can be used. Examples of the neutralizing agent include alkali metal hydroxides, alkaline earth metal hydroxides, aliphatic amine compounds, and alkanolamine compounds, etc.

Examples of the alkali metal hydroxide include lithium hydroxide, sodium hydroxide, potassium hydroxide, and the like. Examples of the alkaline earth metal hydroxide include beryllium hydroxide, magnesium hydroxide, calcium hydroxide, strontium hydroxide, etc. Among these, the alkali metal hydroxide is preferred, and lithium hydroxide or sodium hydroxide is more preferred.

Examples of the aliphatic amine compound include ammonia, monomethylamine, dimethylamine, trimethylamine, monoethylamine, dimethylamine, trimethylamine, etc. Among these, ammonia or triethylamine is preferred.

Examples of the alkanolamine compound include monoethanolamine, diethanolamine, triethanolamine, monopropanolamine, dipropanolamine, tripropanolamine, methylethanolamine, dimethylethanolamine, N-methyldiethanolamine, and the like. Among these, a tertiary alkanolamine is preferred, and triethanolamine is more preferred.

A used amount of the neutralizing agent is not particularly limited. When neutralized with a theoretical equivalent of the acid value of a dispersant, the degree of neutralization is 100%, and the neutralizing agent can also be used in excess of the theoretical equivalent. The degree of neutralization is typically from 50 to 200%, preferably from 80 to 150%, and more preferably from 100 to 120%.

When a dispersant having an acid value exceeding 200 mgKOH/g is used, by keeping the degree of neutralization lower than 100%, the same effect as that achieved when using a dispersant having an acid value lower than 200 mgKOH/g may be obtained.

As a method of coating the surface of a coloring agent with a dispersant, a known method can be mentioned. The method is roughly classified into two methods, a physical or mechanical technique and a chemical technique. The latter chemical technique includes a surface deposition method, a kneading method, an interfacial polymerization method, etc. Here, the surface deposition method is a method of depositing a dispersant on a surface of a coloring agent by utilizing pH adjustment or a difference in solubility in the medium, and includes an acid deposition method, a phase inversion emulsification method, and the like. The interfacial polymerization method is a method in which a monomer, an oligomer, or a pigment derivative adsorbs on a surface of a coloring agent and then a polymerization reaction is performed, and the method is also called a surface polymerization method. Although any of the above methods can be used, among these, the surface deposition method is preferred, and the phase inversion emulsification method is more preferred. Note that "coating a surface of a coloring agent with a dispersant" in this specification means coating a at least a part of a surface of a coloring agent with a dispersant.

An average particle diameter of particles of a coloring agent dispersed by a dispersant is typically from 10 to 200 nm, preferably from 50 to 150 nm, and more preferably from 60 to 120 nm. By establishing such an average particle diameter, dispersion stability and ejection stability become excellent, and printing density of the recorded image can be increased. The average particle diameter can be obtained, for example, by measuring a dispersion using a laser light scattering method.

Examples of a method of dispersing a coloring agent include a method using a sand mill (bead mill), a roll mill, a ball mill, a paint shaker, an ultrasonic disperser, a microfluidizer, and the like, and among them, the method using a sand mill is preferred. It is desirable to perform preparation of a dispersion using a sand mill under conditions in which dispersing efficiency is increased by, for example, using beads having a small diameter (diameter of 0.01 to 1 mm) to increase a bead filling rate. By performing dispersion under such conditions, it is possible to reduce the particle diameter of the coloring agent and to obtain a dispersion having good dispersibility.

It is also preferred to remove solid components having a large particle size from the prepared dispersion, using a method selected from filtration, centrifugation, and the like. In addition, when foaming is vigorous in the preparation of a dispersion, an extremely small amount of a defoaming agent of a silicone type or an acetylene glycol type, etc. can be added. However, since there is also a defoaming agent which inhibits dispersion or microparticulation of coloring agents, it is preferable to appropriately select and use the type of defoaming agent.

(Urethane Resins)

When a color ink contains a water-insoluble coloring agent, it is preferable for the color ink to further contain a urethane resin.

Urethane resins are often commercially available in the form of latex (emulsion) and can be easily purchased. Examples of the commercially available products include latexes PERMARIN UA-150, 200, 310, 368 and 3945 and UCOAT UX-320 (manufactured by Sanyo Chemical Industries, Ltd.), latexes HYDRAN WLS-201, 210, HW-312B (manufactured by DIC Corporation), Superflex 150, 170, 470 (manufactured by DKS Co., Ltd.), and the like. Many of them are emulsions containing 30 to 60% of solid content.

Among the urethane resins, polycarbonate urethane resins are preferred. Examples of the commercially available products of polycarbonate urethane resin include PERMARIN UA-310, 3945; UCOAT UX-320, and the like, and among these, UCOAT UX-320 is preferred.

(Water-Soluble Organic Solvents)

It is preferable for the color ink to contain a water-soluble organic solvent. Examples of the water-soluble organic solvent include C1 to C4 monools such as methanol, ethanol, n-propanol, isopropanol, n-butanol, isobutanol, secondary butanol, tertiary butanol, etc.; C2 to C6 alkane diols, such as ethylene glycol, propylene glycol, 1,3-propanediol, 1,2- or 1,4-butanediol, 1,3-pentanediol, 1,5-pentanediol, 1,2-hexanediol, 1,6-hexanediol, etc.; C3 to C6 alkanetriols such as glycerin, hexane-1,2,6-triol, trimethylolpropane, etc.; carboxylic acid amides, such as N,N-dimethyl formamide, N,N-dimethylacetamide, etc.; heterocyclic ureas, such as 2-pyrrolidone, N-methyl-2-pyrrolidone, 1,3-dimethylimidazolidin-2-one, 1,3-dimethylhexahydropyrimid-2-one, etc.; ketones or ketoalcohols, such as acetone, methyl ethyl ketone, 2-methyl-2-hydroxypentan-4-one, etc.; linear or cyclic ethers such as 1,2-dimethoxyethane, tetrahydrofuran, dioxane, etc.; di- or tri-C2 to C3-alkylene glycols or thioglycols such as diethylene glycol, triethylene glycol, dipropylene glycol, thiodiglycol, etc.; poly C2 to C3 alkylene glycol having four or more repeating units and a molecular weight of about 20,000 or less (preferably those in a liquid state) such as tetraethylene glycol, polyethylene glycol (preferably, those having a molecular weight of 2,000 or less, such as 400, 800, 1540, etc.), polypropylene glycol, etc.; polyglyceryl ethers such as diglycerin, triglycerin, polyglycerin, etc.; polyglycerin oxide alkylene adducts; polyoxy C2 to C3 alkylene polyglyceryl ethers such as polyoxyethylene polyglyceryl ether, polyoxypropylene polyglyceryl ether, etc.; C1 to C4 alkyl ethers of polyhydric alcohols, such as ethylene glycol monomethyl ether, ethylene glycol monoethyl ether, diethylene glycol monomethyl ether, diethylene glycol monoethyl ether, diethylene glycol monobutyl ether (butyl carbitol), triethylene glycol monomethyl ether, triethylene glycol monoethyl ether, triethylene glycol monoethyl ether, triethylene glycol monobutyl ether, etc.; cyclic esters or carbonates such as γ-butyrolactone, ethylene carbonate, etc.; dimethyl sulfoxide; acetic acid; and the like.

Further, it is preferable for the color ink to further contain a polyglycerin oxide alkylene adduct, preferably a diglycerin C2 to C4 alkylene adduct. Examples of the commercial products of diglycerin C2 to C4 alkylene adducts include SC-P400, SC-P750, SC-P1000, SC-P1200, SC-P1600, SC-E450, SC-E750, SC-E1000, SC-E1500, SC-E2000, SC-E3000, SC-E4500 (manufactured by Sakamoto Yakuhin Kogyo Co., Ltd.); UNILUB DGP-700 and DGP-700F (manufacture by NOF Corporation); and the like. The content of the polyglycerin oxide alkylene adduct in the total amount of the color ink is typically about 0.5 to 2.5%, and preferably about 1 to 2%.

(Nonionic Surfactants)

It is preferable for the color ink to contain a nonionic surfactant. Examples of the nonionic surfactant include an ether type, such as polyoxyethylene nonylphenyl ether, polyoxyethylene octylphenyl ether, polyoxyethylene dodecylphenyl ether, polyoxyethylene oleyl ether, polyoxyethylene lauryl ether, polyoxyethylene alkyl ether, etc.; an ester type, such as polyoxyethylene oleate, polyoxyethylene distearate, sorbitan laurate, sorbitan monostearate, sorbitan monooleate, sorbitan sesquioleate, polyoxyethylene monooleate, polyoxyethylene stearate, etc.; an acetylene glycol type such as 2,4,7,9-tetramethyl-5-decyne-4,7-diol, 3,6-dimethyl-4-octyne-3,6-diol, 3,5-dimethyl-1-hexyn-3-ol, etc.; Surfynol 104, 105PG50, 82, 420, 440, 465, 485, DF-110D and Olfine STG (manufactured by Nissin Chemical Industry Co., Ltd.); a polyglycol ether type, such as TergItol 15-S-7 (manufactured by SIGMA-ALDRICH, Inc.); and the like. Among these, acetylene glycol surfactants are preferred.

As the acetylene glycol surfactant, for example, a surfactant selected from 2,4,7,9-tetramethyl-5-decyne-4,7-diol, 2,4,7,9-tetramethyl-5-decyne-4,7-diol, 2,4-dimethyl-5-decyn-4-ol and 2,4-dimethyl-5-decyn-4-ol or alkylene oxide adducts thereof is preferred. Examples of the alkylene oxide include linear, branched, or cyclic alkylene oxides of C2 to C4. Among these, a linear or branched alkylene oxide is preferred. Such surfactants include Olfine series such as Olfine 104, E1010, etc. (manufactured by Air Products Co., Ltd.); Surfynol series 420 440, 465, 61, etc. (manufactured by Nissin Chemical Industry Co., Ltd.); and the like.

(Ink Preparation Agents)

The color ink may further contain an ink preparation agent other than the above, if required. Examples of the ink preparation agent include an antifungal agent, an antiseptic agent, a pH adjusting agent, a chelating agent, a rust preventive agent, a water-soluble ultraviolet absorbing agent, a water-soluble polymer compound, an antioxidant, etc.

(Content Ratio of Each Component)

One type of the above-described components may be used singly, or two or more types thereof may be used in combination. The content ratio of each component in the total mass of the color ink (when two or more types of compounds are contained, the sum thereof) is, for example, as follows.

Incidentally, the balance other than these is water.

A water-insoluble coloring agent: typically, 1 to 15%, preferably 1 to 10%, and more preferably 1 to 7%.
A dispersant: typically, 0.1 to 15%, preferably 0.1 to 9%, and more preferably 0.2 to 6%.
A urethane resin: typically, 1 to 20%, preferably 3 to 15%, and more preferably 3 to 12%.
A water-soluble organic solvent: typically, 10 to 45%, preferably 20 to 45%, and more preferably 30 to 40%.
A nonionic surfactant: typically, from 0.01 to 5%, preferably from 0.05 to 3%, and more preferably from 0.2 to 2.5%.
An ink preparation agent: typically, 0 to 5%, preferably 0.1 to 2%, and more preferably 0.2 to 1%.
(Surface Tension)
The surface tension at 25° C. of the color ink is typically 29 to 35 mN/m, and preferably 30 to 34 mN/m.
(Preparation Method of Color Inks)
A method for preparing a color ink is not particularly limited, and a known method can be employed. As an example thereof, a method may be mentioned, in which an aqueous dispersion containing a water-insoluble coloring agent and a dispersant is prepared, and then other components are added and stirred. When the color ink contains a water-soluble dye, a method can be employed, in which necessary components are added and stirred without preparing a dispersion. The obtained color ink may be subjected to microfiltration by a known method if necessary, to filter off solid impurities. For example, when the color ink is ejected by an ink jet printer, it is preferable to perform microfiltration.

The ink set according to the present embodiment is extremely useful as an ink set for textile printing of fibers because a color image having good solid filling can be formed when a color ink is adhered on a base formed of the white ink.

<Recording Method>
In the recording method according to the present embodiment using the ink set described above, recording is performed by adhering each ink included in the ink set to a recording material. There is no particular limitation on the method of adhering each ink to a recording material, and a brush pen, a roll coater, a bar coater, an ink jet printer, or the like can be used depending on the purpose.

When an ink jet printer is used, recording can be performed by setting a container filled with each ink at a predetermined position of the ink jet printer, discharging droplets of each ink according to a recording signal, and adhering them to a recording material.

There is no limitation on the nozzle and the like of the ink jet printer, and can be appropriately selected according to the purpose. Further, the method of the ink jet printer is not particularly limited, and a known method, for example, a charge control method in which ink is discharged using an electrostatic attraction force; a drop-on-demand method (pressure pulse method) in which vibration pressure of a piezo element is utilized; an acoustic ink jet method in which an electric signal is irradiated to ink by changing the electric signal to an acoustic beam and the radiation pressure is utilized to eject the ink; a thermal ink jet method in which ink is heated to form bubbles and utilize the generated pressure; and the like can be appropriately selected.

Although there is no limitation on the recording material, a fiber, a fabric which is a structure thereof, and the like are preferred.

The type of fiber is not particularly limited. Examples thereof include a fiber selected from the group consisting of polyesters, celluloses, polyamides, and natural fibers, or blend fibers thereof. Examples of the polyester fiber include fibers containing polyethylene terephthalate as a main component. Examples of the cellulose fiber include cotton, rayon, triacetate fibers, diacetate fibers, etc. Examples of the polyamide fiber include nylon fibers and the like. Examples of the natural fiber include silk, wool, etc.

The fiber may be provided with an ink receiving layer (bleeding prevention layer). A method of providing an ink receiving layer on a fiber is known, and such a fiber can be purchased as a commercially available product. Further, it is also possible to appropriately select constituent components, a forming method, and the like from known techniques and to provide the ink receiving layer on the fiber. The ink receiving layer is not particularly limited as long as it has its function therefor.

After attaching each ink to a fiber, a baking (thermosol) process can be performed, if necessary. Examples of the baking treatment include conditions of typically 130 to 250° C., preferably 170 to 210° C., typically 10 seconds to 30 minutes, and preferably 60 to 180 seconds. This method is also referred to as dry heat fixation or the like.

For all of the above-described matters, a combination of preferred ones is more preferred, and a combination of more preferred ones is further preferred. The same applies to combinations and the like of a preferred one with a more preferred one, and a more preferred one with a further preferred one.

EXAMPLES

Hereinafter, the present invention is described in more detail with reference to the Examples, but the present invention is not limited to these Examples only. Each of the operations such as synthesis reactions, crystallizations, and the like in the Examples was carried out under stirring unless otherwise specified. In addition, as a temperature of a reaction, etc., an internal temperature of the reaction solution, etc. was described. In addition, "water" used in the Examples is "ion-exchanged water", unless otherwise specified. In addition, a solid content of liquid was determined by a dry-weight method, using MS-70 manufactured by A & D Company, Limited. The content of a coloring agent is that of only the coloring agent itself obtained by calculating from the total content of a solid content contained in the dispersion.

Examples 1 to 5 and Comparative Examples 1 to 7: Preparation of White Inks

The components described in Table 1 below were thoroughly stirred and mixed to obtain white inks. Each of the obtained white inks was filtered through a filter of mixed cellulose ester having a pore diameter of 5 μm, and then subjected to degassing treatment using a vacuum pump to obtain white ink W1 for test. The numerical values in Table 1 below are expressed in "part(s)", and are in terms of solid content.

Abbreviations, etc. in Table 1 below have the following meanings.
$TiO_2$=TF-5760 WHITE (D2B) (titanium oxide slurry manufactured by Dainichiseika Ltd., titanium oxide solid content concentration: 60%, mean particle diameter: 300 nm)
UX-320=UCOAT UX-320 (polycarbonate urethane resin manufactured by Sanyo Chemical Industries, Ltd., solid content concentration: 40%)
UA-150=PERMARIN UA-150 (polyether urethane resin manufactured by Sanyo Chemical Industries, Ltd., solid content concentration: 30%)

UWS-145=UCOAT UWS-145 (polyester urethane resin manufactured by Sanyo Chemical Industries, Ltd., solid content concentration: 36%)
UX-390=UCOAT UX-390 (polycarbonate urethane resin manufactured by Sanyo Chemical Industries, Ltd., solid content concentration: 38%)
UA-368=PERMARIN UA-368 (polycarbonate urethane resin manufactured by Sanyo Chemical Industries, Ltd., solid content concentration: 50%)
WLS-201=HYDRAN WLS-201 (polycarbonate urethane resin manufactured by DIC Corporation, solid content concentration: 35%)
R967=NeoRez R-967 (polyether urethane resin manufactured by Kusumoto Chemicals, Ltd., solid content concentration: 40%)
GL=glycerin
PG=Propylene glycol
SF104=Surfynol 104PG50
LA-10=Hytenol LA10
DYNOL=Dynol 604
TEA=Triethanolamine
GXL(S)=PROXEL GXL (S)

a white solid pattern image was ink jet recorded. At this time, the white solid pattern image was recorded repeatedly two times at a head temperature of 25° C. and a resolution of 1200×2400 dpi. Heating treatment was performed on the fiber to which the obtained white ink was adhered, in a hot air dryer at 150° C. for 4 minutes to obtain a fiber for evaluation.

The following evaluation tests were performed on the fiber for evaluation obtained as described above. Evaluation results of each test are shown in Table 2 below.

[Evaluation of Degree of Whiteness]

Evaluation of degree of whiteness was performed by measuring an L* value of a fiber for evaluation. As a colorimeter, eXact manufactured by X-Rite Inc. was used to measure the L* value in CIE/L*a*b* color system. As for color measurement conditions at that time, an observation light source was D65, an observation field was 2°, and the density was Status T. Color measurement was performed five times on each fiber for evaluation, and the average value thereof was used as a measurement result. The larger the L* value, the more preferred the fiber, since a larger L* value exhibits a higher degree of whiteness.

TABLE 1

| Component | Example | | | | | Comparative Example | | | | | | |
|---|---|---|---|---|---|---|---|---|---|---|---|---|
| | 1 | 2 | 3 | 4 | 5 | 1 | 2 | 3 | 4 | 5 | 6 | 7 |
| TiO$_2$ | 10 | 10 | 10 | 10 | 10 | 10 | 10 | 10 | 10 | 10 | 10 | 10 |
| UX-320 | 10 | 10 | 12 | 13 | 8 | — | — | — | — | 16 | — | — |
| UX-390 | — | — | — | — | — | — | — | — | — | — | — | 16 |
| UA-368 | — | — | — | — | — | — | 16 | — | — | — | — | — |
| R-967 | 5 | 5 | 4 | 3 | 8 | — | — | — | 16 | — | — | — |
| UA-150 | — | — | — | — | — | 16 | — | — | — | — | — | — |
| WLS-201 | — | — | — | — | — | — | — | 16 | — | — | — | — |
| UWS-145 | — | — | — | — | — | — | — | — | — | — | 16 | — |
| GL | 20 | 20 | 20 | 20 | 20 | 20 | 20 | 20 | 20 | 20 | 20 | 20 |
| PG | 7.5 | 7.5 | 10 | 8 | 7 | 6 | 7.5 | 11 | 6 | 8 | 2 | 2.5 |
| SF104 | 0.7 | — | 0.7 | 0.7 | 0.7 | 0.7 | 0.7 | 0.7 | 0.7 | 0.7 | 0.7 | 0.7 |
| LA-10 | 0.1 | — | 0.1 | 0.1 | 0.1 | 0.1 | 0.1 | 0.1 | 0.1 | 0.1 | 0.1 | 0.1 |
| DYNOL | — | 0.8 | — | — | — | — | — | — | — | — | — | — |
| TEA | 0.5 | 0.5 | 0.5 | 0.5 | 0.5 | 0.5 | 0.5 | 0.5 | 0.5 | 0.5 | 0.5 | 0.5 |
| GXL(s) | 0.1 | 0.1 | 0.1 | 0.1 | 0.1 | 0.1 | 0.1 | 0.1 | 0.1 | 0.1 | 0.1 | 0.1 |
| Water | Balance | | | | | Balance | | | | | | |
| Total | 100 | 100 | 100 | 100 | 100 | 100 | 100 | 100 | 100 | 100 | 100 | 100 |

[Preparation of Pretreated Fibers]

A pretreatment liquid for fibers was obtained by adding water to Unisense KHE100L manufactured by Senka Corporation (solid content concentration: 60%, 15 parts), Mowinyl 6960 manufactured by The Nippon Synthetic Chemical Industry Co., Ltd. (solid content concentration: 45%, 1.5 parts), and Epane U-103 manufactured by DKS Co., Ltd. (0.15 parts) to make a total amount 100 parts, and mixing them. The obtained pretreatment liquid was applied to an A4 size area of a T-shirt of 100% cotton (Printstar Heavy Weight manufactured by TOMS Co., Ltd., black cloth) by a roller so that the adhesion amount of the obtained pretreatment liquid was 0.025 g/cm$^2$ of coating amount per unit area. The T-shirt to which the pretreatment liquid obtained was adhered was subjected to heat treatment in a heat press machine at 150° C. for 30 seconds to obtain a pretreated fiber.

[Preparation of Fibers for Evaluation]

Each of the inks of Examples 1 to 5 and Comparative Examples 1 to 7 was ejected to the pretreated area of the pretreated fiber obtained as described above using an industrial ink jet evaluation apparatus (expandable coating apparatus, EV2500 manufactured by Ricoh Company Ltd.), and

[Evaluation of Cracking]

A fiber for evaluation was stretched to the limit with both hands to such an extent that the fiber was not broken, held for 3 seconds, and then the stretching was stopped. The cracking of the white solid pattern image of the fiber was visually observed, and the state thereof was evaluated by evaluation criteria of the following three stages.

—Evaluation Criteria—

A: No cracking due to stretching was observed in the image.
B: Slight cracking occurred due to stretching and black color, the color of the cloth, was slightly observed in the image.
C: Cracking occurred due to stretching and black color, the color of the cloth, was clearly observed in the image.

[Evaluation of Image Unevenness]

A white solid pattern image of the fiber for evaluation was visually observed, and image unevenness was evaluated by the evaluation criteria of the following three stages.

—Evaluation Criteria—

A: No unevenness was observed in the image.
B: Slight unevenness was observed in the image, and there was a portion that was white but had shading.

C: Unevenness was recognized in the image, and there was a portion where a white ink adhered excessively, or a portion where the white ink did not adhere and black color, which is the color of the cloth, was clearly observed.

TABLE 2

|  | Example | | | | |
| --- | --- | --- | --- | --- | --- |
|  | 1 | 2 | 3 | 4 | 5 |
| Degree of whiteness | 91 | 91 | 91 | 92 | 91 |
| Crack | A | A | A | A | A |
| Unevenness in image | A | A | A | A | B |

|  | Comparative Example | | | | | | |
| --- | --- | --- | --- | --- | --- | --- | --- |
|  | 1 | 2 | 3 | 4 | 5 | 6 | 7 |
| Degree of whiteness | 93 | 89 | 92 | 93 | 88 | 86 | 87 |
| Crack | A | A | A | A | C | C | C |
| Unevenness in image | C | B | C | C | A | B | B |

From the results shown in Table 2, it was found that the fibers using the white inks of Examples 1 to 5 had higher degree of whiteness and suffered a low degree of cracking due to stretching and image unevenness was extremely small, as compared with the fibers using the white inks of Comparative Examples 1 to 7.

Preparation Examples 1 to 2: Preparation of White Inks

The components described in Table 3 below were thoroughly stirred and mixed to obtain white inks. The obtained white inks were filtered through a filter of mixed cellulose ester having a pore diameter of 5 μm, and then subjected to degassing treatment using a vacuum pump to obtain white inks W1 and W2 for tests. Numerical values in Table 3 below are expressed in "part(s)", and are given in terms of solid content.

Abbreviations and the like in Table 3 below have the following meanings.
TiO$_2$=TF-5760 WHITE (D2B) (titanium oxide slurry manufactured by Dainichiseika Ltd., titanium oxide solid content concentration: 60%, mean particle diameter: 300 nm)
UX-320=UCOAT UX-320 (polycarbonate urethane resin manufactured by Sanyo Chemical Industries, Ltd. solid content concentration: 40%)
R967=NeoRez R-967 (polyether urethane resin manufactured by Kusumoto Chemicals, Ltd., solid content concentration: 40%)
GL=glycerin
PG=propylene glycol
604=Dynol 604
TEA=triethanolamine
GXL(S)=PROXEL GXL(S)

TABLE 3

| Component | Prepration Example 1 Ink No. W1 | Prepration Example 2 Ink No. W2 |
| --- | --- | --- |
| TiO$_2$ | 10 | 10 |
| UX-320 | 13 | 13 |
| R967 | 3 | 3 |
| GL | 17 | 15 |
| PG | 5 | 7.5 |
| 604 | 0.9 | 0.45 |
| TEA | 0.4 | 0.4 |

TABLE 3-continued

| Component | Prepration Example 1 Ink No. W1 | Prepration Example 2 Ink No. W2 |
| --- | --- | --- |
| GXL(S) | 0.05 | 0.05 |
| Water | Balance | Balance |
| Total | 100 | 100 |

Synthesis Example 1: Synthesis of Dispersant

In accordance with "[Synthesis Example 3] Synthesis of Block Copolymer A" of PCT International Publication No. WO 2013/115071, 138 g of a dispersant having a mass average molecular weight of 24,300 and a PDI of 1.49 was obtained. In the obtained dispersant, the monomer constituting the B block is benzyl methacrylate, and the monomer constituting the A block includes two types: one is a monomer represented by the formula (3), in which $R^5$ is a hydrogen atom and $R^6$ is a methyl group and the other is a monomer represented by the formula (3), in which $R^5$ is an n-butyl group and $R^6$ is a methyl group.

Preparation Example 3: Preparation of Dispersion Containing Coloring Agent

The dispersant (6.3 parts) obtained in Synthesis Example 1 was dissolved in 2-butanone (20 parts) to obtain a solution. To this solution, a solution obtained by dissolving 0.47 parts of sodium hydroxide in water (51.45 parts) was added and stirred for 1 hour to obtain an emulsified solution. To the obtained liquid, C.I. Pigment Yellow 155 (21 parts) was added, and the dispersion treatment was carried out under water cooling with a sand grinder under conditions of 1500 rpm for 15 hours to obtain a liquid. The obtained liquid was diluted with ion-exchanged water, and beads for dispersion were filtered off to obtain a filtrate. This filtration separation was carried out by overlapping two sheets of glass filter paper manufactured by Advantech Co., Ltd., so that GA100 was upper and GC50 was lower. A dispersion having a coloring agent content of 12% was obtained by distilling off the 2-butanone and a portion of water in the obtained filtrate under reduced pressure in an evaporator. This dispersion is referred to as "DP1".

Preparation Examples 4 to 6: Preparation of Dispersions Containing Coloring Agents DP2 to DP4 as dispersions of Preparation Examples 4 to 6 were obtained in the same manner as in Preparation Example 3, except that each of the components used in Preparation Example 3 was replaced with each of the components and used amounts disclosed in Table 4 below. Note that a numerical value of each component is expressed in "part(s)", and an added amount of water was adjusted so that the total content of coloring agents in each dispersion was 12%.

Abbreviations and the like in Table 4 below have the following meanings.
PY155=C.I. Pigment Yellow 155
PR122=C.I. Pigment Red 122
PB15:4=C.I. Pigment Blue 15:4
CB=carbon black
DpA=dispersant synthesized in Synthesis Example 1
MEK=2-butanone NaOH=sodium hydroxide

TABLE 4

| Component | Prepration Example | | | |
|---|---|---|---|---|
| | 3 | 4 | 5 | 6 |
| PY155 | 21 | — | — | — |
| PR122 | — | 20 | — | — |
| PB15:4 | — | — | 20 | — |
| CB | — | — | — | 24 |
| DpA | 6.3 | 6 | 6 | 7.2 |
| MEK | 20 | 20 | 20 | 20 |
| NaOH | 0.47 | 0.34 | 0.45 | 0.54 |
| Water | Balance | | | |
| Total | 100 | 100 | 100 | 100 |
| DP No. | DP1 | DP2 | DP3 | DP4 |

Preparation Examples 7 to 10: Preparation of Color Inks

Each of the components described in Table 5 below was mixed and thoroughly stirred, and then filtered through a membrane filter having a pore diameter of 3 μm to obtain inks of Y1, M1, C1, and K1 used in the evaluation test. Note that numerical values of the respective components are expressed in "part(s)", and the added amount of water was adjusted so that the total of components was 100 parts.

Abbreviations and the like in Table 5 below have the following meanings.
UX-320=UCOAT UX-320 (polycarbonate urethane resin manufactured by Sanyo Chemical Industries, Ltd., solid content concentration: 40%)
PG=propylene glycol
GL=glycerin
DGA=SC-P1000
TEA=triethanolamine
SF420=Surfynol 420
SF104=Surfynol 104PG50
GXL(S)=PROXEL GXL(S)

TABLE 5

| Component | Prepration Example | | | |
|---|---|---|---|---|
| | 7 | 8 | 9 | 10 |
| DP1 | 33.1 | | | |
| DP2 | | 34.3 | | |
| DP3 | | | 30.0 | |
| DP4 | | | | 31.8 |
| UX-320 | 13.6 | 15 | 14.8 | 14.9 |
| PG | 12 | 13.5 | 13 | 9 |
| GL | 21 | 19.5 | 23 | 17 |
| DGA | | | | 1.5 |
| TEA | 0.5 | 0.5 | 0.5 | 0.5 |
| SF420 | 0.9 | 0.9 | 0.8 | 0.7 |
| SF104 | 0.2 | 0.2 | 0.2 | 0.15 |
| GXL(S) | 0.05 | 0.05 | 0.05 | 0.05 |
| Water | Balance | | | |
| Total | 100 | 100 | 100 | 100 |
| Ink No. | Y1 | M1 | C1 | K1 |

[Preparation of Pretreated Fibers]

A pretreatment liquid for fibers was obtained by adding water to Unisense KHE100L manufactured by Senka Corporation (dimethylamine-ammonia-epichlorohydrin poly-condensate, solid content concentration: 60%, 7.5 parts), Mowinyl 6960 manufactured by The Nippon Synthetic Chemical Industry Co., Ltd. (styrene/acrylic resin emulsion, solid content concentration: 45%, Tg=−23° C., 0.75 parts), and Epane U-103 manufactured by DKS Corporation (0.075 parts) to make a total amount 100 parts, and mixing them. The obtained pretreatment liquid was applied to an A4 size area of a T-shirt of 100% cotton (Printstar Heavy Weight manufactured by TOMS Co., Ltd., black cloth) by a roller so that the adhesion amount of the obtained pretreatment liquid was 0.025 g/cm$^2$ of the coating amount per unit area. The T-shirt to which the pretreatment liquid obtained was adhered was subjected to heat treatment at 150° C. in a heat press machine for 30 seconds to obtain a pretreated fiber.

[Preparation of Fibers for Evaluation]

The white ink was ejected to the pretreated portion of the pretreated fiber obtained as described above, using a garment printer (VJ-405GT manufactured by Mutoh Industries Ltd.) in a print setting mode of 600×1200 dpi to obtain a fiber to which the white ink was adhered. After the white ink, a color ink was ejected using the garment printer (VJ-405GT manufactured by Mutoh Industries Ltd.) in a print setting mode of 600×1200 dpi to obtain a fiber to which the color ink was adhered. Heating treatment was performed on the fiber obtained in a hot air dryer at 150° C. for 4 minutes to obtain a fiber for evaluation.

[Colorimetry Conditions]

When colorimetry was required for the thus-obtained fibers for evaluation tests, colorimetry was performed using X-Rite eXact, which is a spectrophotometer colorimeter manufactured by X-Rite Inc., under the following conditions: an observation light source: D65, a viewing angle: 2°, and density: ANSI T. In addition, the colorimetry was performed in a CIE/L*a*b* color system.

[Evaluation Test for Solid Filling by Color Inks]

For each of the fibers for evaluation tests, degree of solid filling of the respective color images was visually confirmed and evaluated according to criteria of three stages described below. The evaluation results are shown in Tables 6 and 7 below.

—Evaluation Criteria—

A: White streaks could not be identified and solid filling was good.

B: Although some white streaks could be identified, solid filling was relatively good.

C: There were areas where white streaks could be clearly identified, and solid filling was not good.

D: A large number of white streaks were identified and solid filling was not achieved.

[Surface Tension Measurements]

The surface tension of each ink was measured by a plating method using a CBVP—Z type surface tension meter manufactured by Kyowa Interface Science Co., Ltd. at a room temperature of 25° C. The measurement results are shown in Tables 6 and 7 below. The unit of surface tension in the respective tables is "mN/m."

TABLE 6

| Ink set | Example | | | | | | | |
|---|---|---|---|---|---|---|---|---|
| | 6 | | 7 | | 8 | | 9 | |
| Ink No. | W1 | Y1 | W1 | M1 | W1 | C1 | W1 | K1 |
| Surface tension | 32 | 30 | 32 | 30 | 32 | 30 | 32 | 30 |
| Solid filling | A | | A | | A | | A | |

TABLE 7

|  | Comparative Example | | | | | | | |
|---|---|---|---|---|---|---|---|---|
| Ink set | 8 | | 9 | | 10 | | 11 | |
| Ink No. | W2 | Y1 | W2 | M1 | W2 | C1 | W2 | K1 |
| Surface tension | 35 | 30 | 35 | 30 | 35 | 30 | 35 | 30 |
| Solid filling | C | | C | | C | | C | |

From the results shown in Tables 6 and 7, it was found that the fibers using the ink sets of Examples 6 to 9 had better solid filling by color inks compared with the fibers using the ink sets of Comparative Examples 8 to 11

The invention claimed is:

1. A white ink comprising a white pigment, a polycarbonate urethane resin, a polyether urethane resin and water, wherein a content of the polycarbonate urethane resin is 5 to 15% by mass, a content of the polyether urethane resin is 1 to 15% by mass, and a total content of the polycarbonate urethane resin and the polyether urethane resin is 10 to 20% by mass.

2. The white ink according to claim 1, wherein the white ink further comprises a water-soluble organic solvent.

3. The white ink according to claim 1, wherein the white ink further comprises a surfactant.

4. The white ink according to claim 3, wherein the surfactant is at least one selected from the group consisting of an acetylene glycol and a polyalkylene glycol.

5. An ink set, comprising the white ink according to claim 1 and at least one type of color ink, wherein the color ink is an aqueous ink comprising a coloring agent other than the white pigment, and a difference in surface tension at 25° C. between the white ink and the color ink is ±0 to 3 mN/m.

6. A recording method, wherein recording is performed by adhering the white ink according to claim 1 to a recording material.

7. The recording method according to claim 6, wherein recording is performed by discharging the white ink using an ink jet printer and adhering the white ink to the recording material.

8. A recording method, wherein recording is performed by adhering each ink included in the ink set according to claim 5 to a recording material.

9. The recording method according to claim 8, wherein recording is performed by discharging each ink included in the ink set using an ink jet printer and adhering the ink to the recording material.

10. The recording method according to claim 6, wherein the recording material is a fiber selected from the group consisting of polyester fibers, cellulose fibers, polyamide fibers, and natural fibers, blended fibers containing these fibers, and fabrics containing these fibers.

11. A fiber to which the white ink according to claim 1 is adhered.

12. A fiber to which both the white ink and the at least one type of color ink included in the ink set according to claim 5 are adhered.

* * * * *

UNITED STATES PATENT AND TRADEMARK OFFICE
CERTIFICATE OF CORRECTION

PATENT NO. : 11,401,430 B2
APPLICATION NO. : 16/981990
DATED : August 2, 2022
INVENTOR(S) : Akitsu Hanazato et al.

It is certified that error appears in the above-identified patent and that said Letters Patent is hereby corrected as shown below:

On the Title Page

Column 2 Item (57) (Abstract), Line 1, delete "A white" and insert -- White --.

Column 2 Item (57) (Abstract), Line 3, delete "An ink" and insert -- Ink --.

In the Specification

Column 4, Line 37, delete "Jurimer" and insert -- Jurymer --.

Column 5, Line 16 (Approx.), delete "diisocyante," and insert -- diisocyanate, --.

Column 7, Line 36, delete "Emanorn" and insert -- Emanon --.

Column 17, Line 50, delete "dimethylhexahydropyrimid-2-one," and insert -- dimethylhexahydropyrimidine-2-one, --.

Column 23, Line 1 (Table 3), delete "Prepration" and insert -- Preparation --.

Column 23, Line 1 (Table 3), delete "Prepration" and insert -- Preparation --.

Column 24, Line 1 (Table 3-continued), delete "Prepration" and insert -- Preparation --.

Column 24, Line 1 (Table 3-continued), delete "Prepration" and insert -- Preparation --.

Column 25, Line 1 (Table 4), delete "Prepration" and insert -- Preparation --.

Column 25, Line 25 (Approx.), delete "Ml," and insert -- M1, --.

Signed and Sealed this
Third Day of January, 2023

Katherine Kelly Vidal
*Director of the United States Patent and Trademark Office*

CERTIFICATE OF CORRECTION (continued)
U.S. Pat. No. 11,401,430 B2

Column 25, Line 1 (Table 5), delete "Prepration" and insert -- Preparation --.

Column 27, Line 13, delete "11" and insert -- 11. --.